UNITED STATES PATENT OFFICE.

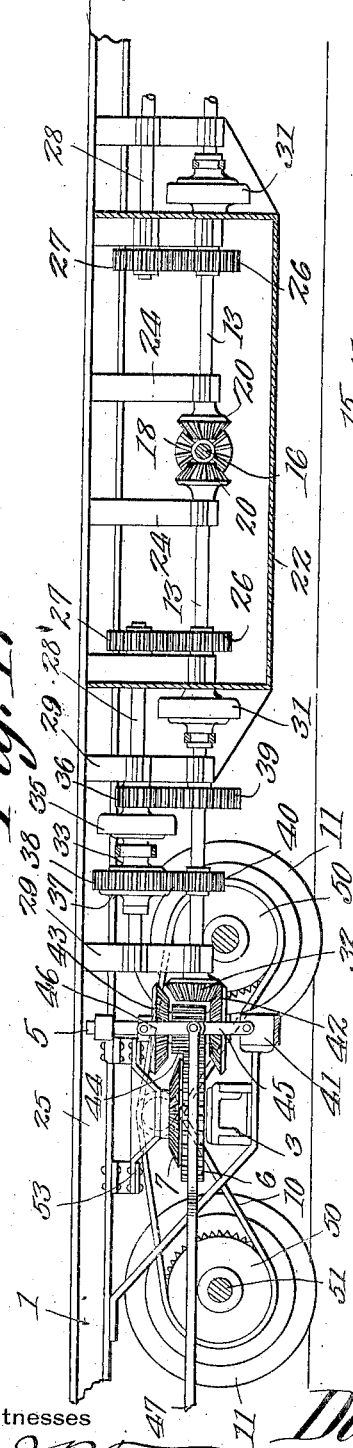

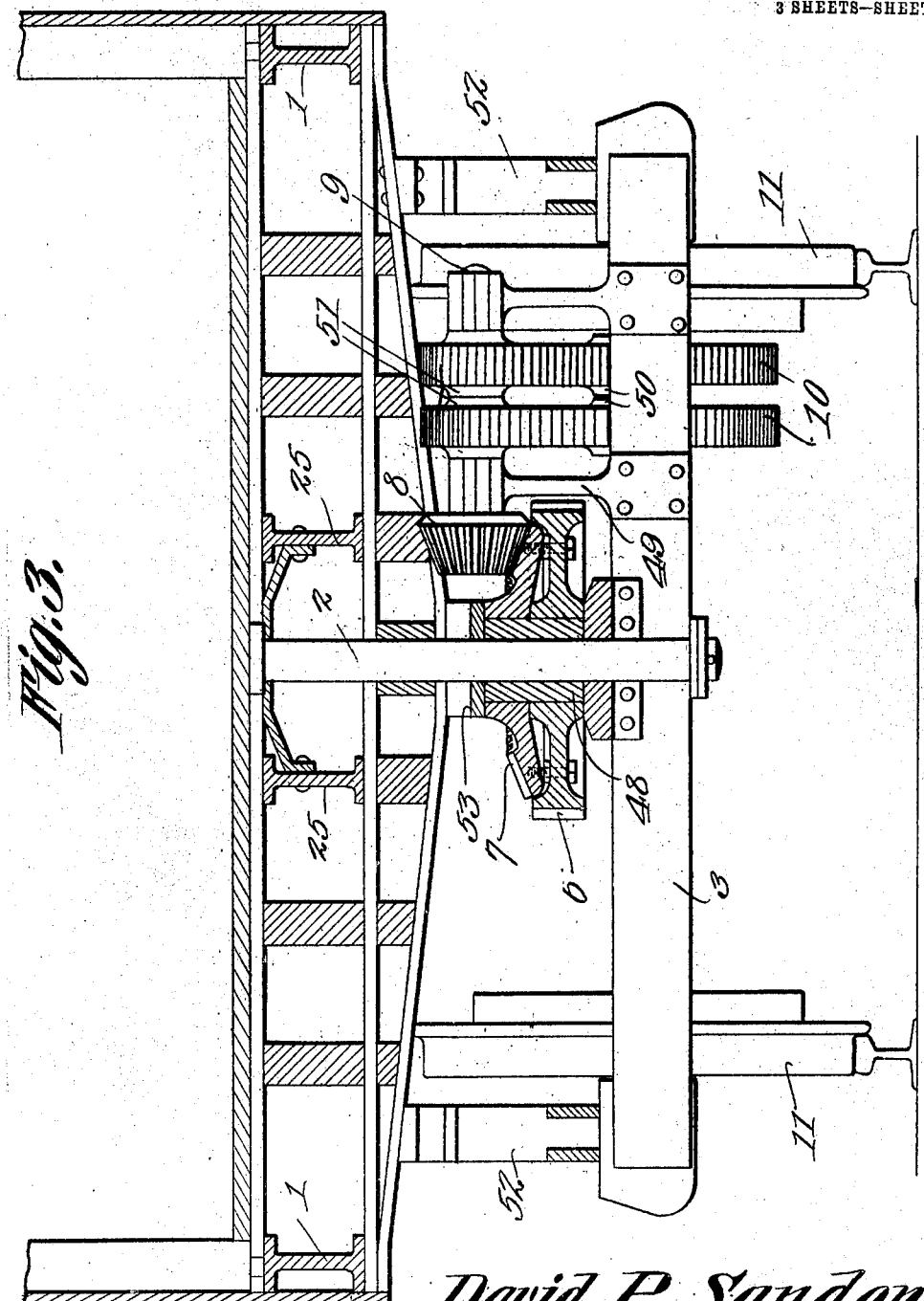

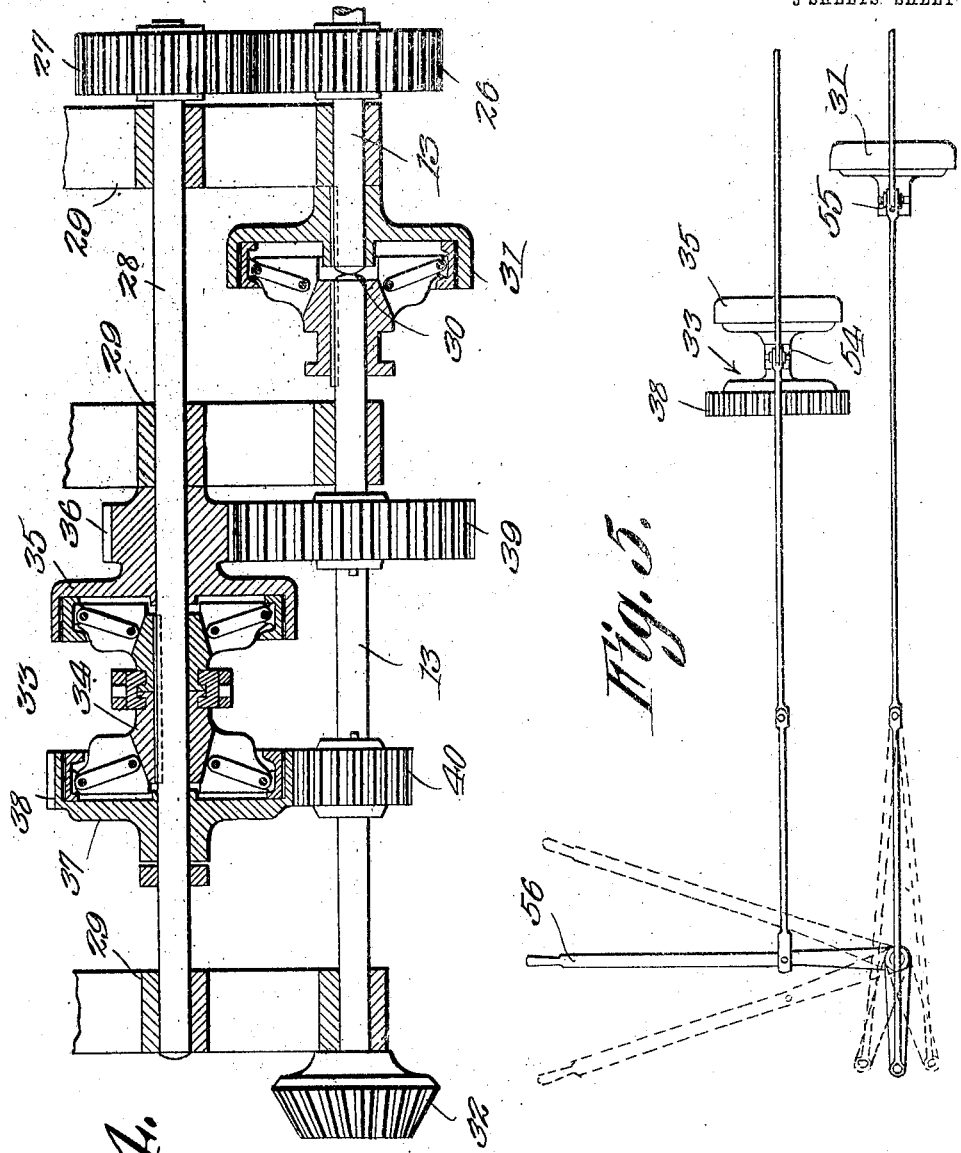

DAVID P. SANDERS, OF LANCASTER, PENNSYLVANIA.

MOTOR-CAR.

1,087,832.  Specification of Letters Patent.  Patented Feb. 17, 1914.

Application filed May 5, 1913. Serial No. 765,660.

*To all whom it may concern:*

Be it known that I, DAVID P. SANDERS, a citizen of the United States, residing at Lancaster, in the county of Lancaster and State of Pennsylvania, have invented a new and useful Motor-Car, of which the following is a specification.

This invention relates to a motor car.

An object of the present invention is to provide a car with a prime mover thereon and with transmission gearing leading therefrom and adapted to transmit power to all wheels of the motor car.

A further object is to provide a transmission gearing for a motor car whereby power is transmitted from a prime mover to both trucks of a car and to provide suitable clutches and spur gearing whereby the car may be driven in either a forward or reverse direction at a number of different speeds.

A further object is to provide a prime mover in the form of an internal combustion engine beneath the car body and rigidly secured thereto and to provide a main shaft leading directly therefrom to each of the car trucks, and to further provide a transmission shaft gearedly connected to the said main shaft whereby the car wheels may be driven at low, intermediate or high speed and to further provide a shifting mechanism whereby the car can be driven in a forward or reverse direction.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in side elevation of a portion of a railroad car equipped with my improved driving mechanism. Fig. 2 is a top plan view of the prime mover and one car truck and disclosing the power transmitting mechanism. Fig. 3 is a cross sectional view of the car taken through the king bolt of one truck. Fig. 4 is a detail view of the power transmitting mechanism including the main and transmission shafts. Fig. 5 is a diagrammatic view showing the clutch shifting mechanism.

Referring to the drawings in which similar reference numerals designate corresponding parts throughout the several views, 1 is the car under frame preferably formed of steel beams and secured thereto by the center or king bolt 2 are the car truck frames 3. In the present drawings only one car truck has been illustrated but it is to be understood that the mechanism which is adapted to transmit power from the prime mover to the one car truck is duplicated upon the other side of the prime mover and is adapted to transmit power to the other truck in precisely the same way as it does to the one illustrated.

Suspended beneath the steel under frame 1 and rigidly secured thereto is the prime mover generally designated as 4 and which is adapted to drive the vertical shaft 5 which in turn is adapted to drive a gear wheel 6 journaled upon the center or king bolt 2. The spur gear 6 is rigidly secured to a second or beveled gear wheel 7 which is adapted to drive a beveled gear 8 in mesh therewith and which latter gear is rigidly secured to a horizontal shaft 9, from which shaft 9 leads the two silent chain drives 10 which are adapted to positively drive the car wheels 11 to thereby impart motion to the car.

The prime mover 4 which is located beneath and approximately central of the steel under frame is an internal combustion engine of the horizontal opposed cylinder type, the exact number of cylinders depending upon the size of the car. As illustrated in Fig. 2 the internal combustion engine comprises the cylinders 12 arranged in pairs and disposed in equal numbers upon opposite sides of the main driving shaft 13 which extends longitudinally of the car and is adapted to transmit the power from the prime mover to the car truck. The crank shaft casing 14 is provided with suitable bearings 15, journaled in which is the crank shaft 16 to the outer extremity of which is rigidly secured the fly wheel 17 and to the opposite end is secured the driving beveled gear 18. The prime mover may be considered to be made up of two units disposed upon opposite sides of the main shaft 13 and in the present illustration each unit comprises four cylinders. It will be apparent however, that one set of cam shafts will serve for both units inasmuch as the crank shafts of the two units are positively connected together. The unit just described may be generally designated by the letter A and the unit upon the opposite side of the main driving shaft 13 may be generally designated by the letter B. The crank shaft of the unit B is provided with a beveled driving gear 19, the two driving gears 18 and 19 being spaced a distance apart and in mesh with two similar beveled gears 20 the same being rigidly secured to the main driving shafts 13, one of which leads to the forward truck of the car and the other to the rear truck, it being noted however that the main driving shafts will be driven in opposite directions, allowance for which is made in the reversing mechanism of the two trucks. The unit A is provided with cam shaft gears 21 which are adapted to actuate the cylinder valves. Completely surrounding the two units is an outer steel casing 22 which is secured to the car steel under frame and is adapted to rigidly support the prime mover therebeneath.

The two units A and B are spaced a distance apart so as to form the central compartment 23 through which extends the main driving shafts 13 supported in suitable bearings or brace members 24, the bearing members 24 adapted to support the shafts 13 in a rotative manner and also adapted to prevent any longitudinal movement or shifting thereof, the same being also true of the crank shaft bearings 15, this being necessary due to the tendency of beveled gears to spring apart.

Secured to and in some instances forming part of the steel under frame are the longitudinal I beams 25 which extend longitudinally central of the car and support the power transmitting mechanism. The power transmitting mechanism includes a set of clutches and gearing whereby the speed imparted to the car wheels may be varied, it being noted that the exact number of speeds may be varied there having been gears and clutches illustrated in Fig. 4 of the drawings whereby three speeds may be obtained from a given "engine speed." As illustrated in Fig. 4 of the drawings the main driving shaft 13 is provided with the spur gear 26 rigidly secured thereto and which gear is adapted to mesh with and drive a similar spur gear 27 which latter is rigidly secured to what is termed the transmission shaft 28. The main driving shaft 13 and transmission shaft 28 are supported by suitable depending shaft hangers or bearing members 29 which depend from and are rigidly secured to the longitudinal I beams 25. The shaft 13 is split or divided as at 30 and the meeting ends of which are provided with a suitable expanding friction clutch 31 which is of the usual construction and when in engagement is adapted to transmit power directly from the engine or prime mover to the beveled gear 32 which is located at the outer or driving end of the main driving shaft 13.

From the foregoing it will be apparent that the transmission shaft is adapted to rotate continuously with and be driven by the main driving shaft 13 and in order to provide means whereby the outer or free end of the driving shaft may be driven at varying velocity ratios with respect to the driven portion of the driving shaft 13, the double friction clutch 33 is provided and includes the central slidable portion 34 which is connected to the shaft 28 by a suitable slot and feather and is adapted to be driven thereby. The central portion 34 of the double clutch is adapted to move into engagement with the drum 35 which is secured to or formed integral with a spur gear 36 journaled upon the shaft 28. The movable portion of the friction clutch is also adapted to move into engagement with a similar drum 37 the outer periphery of which is formed as a spur gear 38 and which drum is also journaled idle upon the shaft 28, it being noted in this connection that suitable collars or other means are provided whereby the drums and the gear wheels therewith are prevented from shifting longitudinally of the shaft.

Rigidly secured to the outer free portion of the main driving shaft 13 are the spur gear wheels 39 and 40 which are of different diameters so that when power is transmitted thereto by means of the spur gears 36 or 38 which are in mesh therewith, the speed or velocity imparted to the beveled driving gear 32 will be varied according to which drum the friction clutch moving member 34 is in engagement with.

In order that the car may be driven in either direction the reversing mechanism as illustrated in Fig. 1 is provided and comprises a fixed vertical shaft 5 the lower extremity of which is supported by the bracket 41 which bracket is rigidly secured to the car under frame. Mounted rotatable upon the vertical shaft 5 which as stated is rigidly secured to the under frame of the car, are the beveled gear wheels 42 and 43, the same being spaced a distance apart by means of the spur gear 44. The gears 42, 43 and 44 are rigidly secured together or formed integral and comprise a carriage which is mounted rotatable and slidable upon the vertical shaft 5 whereby either of the beveled gears 42 or 43 may be brought into mesh with the beveled driving gear 32 of the main driving shaft.

From the foregoing it will be apparent that the direction of rotation of the spur gear 44 will be dependent upon which of the beveled gears which are secured thereto are in mesh with the driving beveled gear 32. In order to provide means whereby the three gears may be shifted the toggle joint is provided and comprises a link 45 rigidly secured to the bracket 41 and also pivotally connected to a link 46 which in turn is rotatably secured to the upper beveled gear 43 so that when the two links 45 and 46 are brought into alinement the link 46 will move the three gears upwardly and bring the lower beveled gear 42 into mesh with the driving beveled gear. When, however, the links 45 and 46 are angularly disposed, the upper beveled gear will be lowered and brought into mesh with the said driving beveled gear, it being noted that a suitable forked lever 47 is provided for the actuation of the said shifting mechanism.

In order to transmit power to the car wheel trucks and at the same time allow for the shifting thereof a spur wheel 6 is journaled rotatable upon a sleeve 48 which sleeve surrounds the center or king bolt 2 and is adapted to support the car frame upon the truck frame. The spur gear 6 is in mesh with the spur gear 44 which latter gear is provided with a wide face so that it will be constantly in mesh with the said spur gear 6 during the shifting of the reversing mechanism. Rigidly secured to or formed integral with the spur gear 6 and positioned thereabove is the beveled gear 7 which meshes with and is adapted to drive the beveled gear 8 which is rigidly secured to the horizontal or counter shaft 9. As illustrated in Fig. 3 of the drawings the counter shaft 9 is supported upon the car truck by suitable standards 49 which standards are in the nature of shaft hangers and serve to hold the shaft 9 against shifting.

From the foregoing it will be apparent that the truck may shift or rotate about the king bolt 2 without bringing the spur gears 6 and 44 out of mesh and without interfering with the transmitting of power therethrough. In order to positively drive the car axles, they are provided with suitable sprocket wheels 50 thereon and which are in alinement with sprocket wheels 51 rigidly secured to the counter shaft 9. Suitable driving chains preferably of the silent type and designated at 10 extend between the said alined sprocket wheels and are adapted to transmit the power from the counter shaft 9 to the car wheel axles 51 which in turn positively drive the car wheels 11 which are secured thereto.

As illustrated in Fig. 3 the car frame is provided with suitable side bearings 52 and the car frame is provided with suitable bolsters 53 which rest upon corresponding parts of the car truck. By providing a prime mover comprising two units arranged on opposite sides of a central main driving shaft and by disposing the cylinders of the prime mover in a horizontal and opposite manner, allows the engine to be disposed beneath the car and to in no way interfere with the clearance thereof. The two prime mover units are positively connected by providing four beveled gears in mesh, two of which are upon the ends of the crank shafts and two upon the meeting ends of the main drive shafts, one of which extends to each of the trucks. With the transmission mechanism as described it will be understood that when low speed is desired the double clutch 33 will be moved into engagement with the drum 35 and the power transmitted from the engine through the gear wheels 26 and 27 to the transmission shaft and from there down through the gears 36 and 39 to the beveled gear 32 at the end of the main driving shaft. From this point it will be transmitted to the car wheel axles through the beveled gears 42 or 43, from the spur gear 44 to the spur gear 6 which is meshed therewith and from there to the counter shaft 9 by reason of the beveled gears 7 and 8. The power is transmitted from this point through the silent chains to the car wheel axles. When it is desired to increase the speed of the car, the clutch 33 is moved to its central point and the clutch 31 thrown into engagement which will transmit the power directly from the engine to the gear 32 and from thence to the car wheel axles as described. When it is desired that the car be run at high speed, the main driving shaft clutch 31 is thrown out of engagement and the transmission clutch 33 moved into engagement with the drum 37 from which the power will be transmitted from the constantly rotating shaft 28 down through the gear 38 and the smaller gear 40 to the beveled gear 32 which will be then rotated at an increased speed.

From the foreging it will be apparent that it is necessary to simultaneously disengage the clutch 31 at the sime time that the beveled clutch 33 is moved into engagement with either one of the two drums with which it is adapted to engage and in order to insure that such will be the case the levers 54 and 55 are provided which are adapted to throw the clutches 33 31 and the said levers extend upward to the front portion of the car and are connected to a lever 56 which is adapted to move the said levers simultaneously and to insure that it will be impossible for the clutch 31 to be in engagement at the same time that the clutch 33 is. The controlling levers for the clutches which are disposed in the transmission gearing for the other truck are also so connected that when the forward truck is in low gear the rear truck will be driven at a corresponding speed and in a like manner the two trucks will be driven at equal speeds at all times. Mention is also made of the fact that inasmuch as the main driving shaft which transmits power to the rear truck will rotate in an opposite direction to that in which the main driving shaft connected to the front truck will rotate, that the actuating lever 47 of the forward truck will be so connected to a similar actuating lever of the rear truck that when the lower of the two beveled gears 42 and 43 are in mesh at the forward truck the opposite one will be in mesh at the rear truck so that the two trucks will be driven in the same direction.

Having thus fully described the invention what I claim to be new and original with me is:—

1. A motor car comprising an under frame with trucks pivotally secured thereto adjacent the ends thereof, a prime mover rigidly secured to the said frame, gears adapted to rotate about the said truck pivot as a center, a shaft disposed adjacent said gears, and a carriage mounted slidably and rotatably upon said shaft, said carriage including gears in mesh with the first mentioned gears, and a transmission mechanism adapted to transmit power from the said prime mover to the said gears.

2. The combination with a car under frame, king bolts extending therethrough and pivotally connecting car trucks thereto, a prime mover rigidly secured to the said car frame, a counter shaft mounted upon the said car trucks, means including chains adapted to transmit power from the said counter shaft to the truck axles, a spur gear rotatably secured to said car truck adapted to rotate about the said king bolt as a center, means for transmitting power from said spur gear to said counter shaft, and means for transmitting power from the said prime mover to said spur gear, said means including a reversing and speed changing mechanism.

3. In a motor car the combination of an under frame, a king bolt extending therethrough and pivotally securing a car truck thereto, said car truck including wheel axles, a counter shaft extending parallel to the said car wheel axles and adapted to transmit power thereto, a spur wheel rotatably secured to the said truck and adapted to rotate about the said king bolt as a center, a shaft rigidly secured to the said car body and extending parallel to the king bolt, a spur gear mounted rotatably and slidably upon the said shaft and in mesh with the king bolt spur gear, and a prime mover rigidly secured to the said under frame and adapted to deliver power at varying speeds and in different directions to the said spur gear mounted upon the under frame shaft.

4. In a motor car the combination of an under frame, a king bolt secured thereto and pivotally engaging a car truck including car wheel axles, a sleeve mounted upon the said king bolt and holding the said car wheel truck and car under frame in spaced relation, a spur gear mounted rotatably upon said sleeve, a counter shaft extending parallel to the car wheel axles, means for transmitting power from said spur gear to said counter shaft, means including silent chains adapted to transmit power from said counter shaft to the said car wheel axles, a vertical shaft rigidly secured to the under frame adjacent the said king bolt, a spur gear mounted rotatably and slidably upon the said vertical shaft and in mesh with the said king bolt spur gear, a prime mover rigidly secured to the said under frame, and a transmitting mechanism adapted to transmit power at varying speeds and in both directions from the said prime mover to the said slidable and rotatable spur gear.

5. Means for transmitting power from a car body to the car wheels comprising a car truck with axles journaled for rotation thereto, a counter shaft secured to the said truck, and extending parallel with the axles thereof, alined sprocket wheels rigidly secured to the car axles and to the said counter shaft, driving chains extending between the said sprocket wheels and adapted to transmit power from the counter shaft to the car axles, a sleeve positioned upon the king bolt extending between the said car truck and the under frame of the car, a beveled gear journaled for rotation upon the sleeve, a beveled gear rigidly secured to the extremity of the counter shaft and meshing with the first mentioned beveled gear, and a spur gear journaled for rotation upon the said sleeve and rigidly secured to the beveled gear, and a vertical shaft rigidly secured to the car frame, a spur gear mounted for translation and rotation thereon and in mesh with the said spur gear, journaled upon the said sleeve and adapted to transmit power thereto.

6. A self-propelled motor car comprising a car body, a king bolt extending downwardly therefrom, a car truck including axles and wheels pivotally secured to the said king bolt, a sleeve secured to the said king bolt adapted to hold the car truck and body in spaced relation, a vertical shaft rigidly secured to the car body, two beveled gears with a spur gear extending therebetween mounted for translation and rotation upon said vertical shaft, means for raising and lowering the said beveled and spur gear wheels, a spur gear journaled for rotation upon said sleeve, said spur gear being in mesh with said shiftable spur gear, a beveled gear supported by said car body and adapted to mesh with the upper and lower of said shiftable beveled gears, and means for supplying power to the said beveled gears to thereby drive the car in a forward and reverse direction.

7. A motor car comprising an under frame, trucks pivotally secured thereto by king bolts, an internal combustion engine of the horizontal opposed cylinder type rigidly secured to the said under frame, said internal combustion engine arranged as two units rotating in opposite directions disposed centrally of a main driving shaft, beveled gears rigidly secured to the engine crank shaft and to the main driving shaft, said driving shaft split between the driving and driven ends, a transmission shaft gearedly connected to the said driving shaft adjacent the driven end, a plurality of gears mounted loose upon the said transmission shaft, a plurality of gears in mesh therewith rigidly secured to the said driving end of the driving shaft, a friction clutch adapted to rigidly secure the said gears upon the transmission shaft to the said shaft, a friction clutch adapted to engage the split ends of the said main driving shaft, a beveled gear rigidly secured to the driving end of the main driving shaft, a vertical shaft rigidly secured to the car frame, two beveled gears and a spur gear therebetween rigidly secured together and mounted for rotation and translation upon said vertical shaft, means for the shifting of the said gears to bring the upper and lower beveled gears in mesh with said driving shaft beveled wheel, and a spur gear mounted for rotation upon the said king bolt and in mesh with the said vertical shaft shiftable spur gear, and means for transmitting power from the said king bolt spur gear to the truck wheels.

8. A prime mover for motor cars comprising two units of the horizontal opposed cylinder type, said units spaced a distance apart, the adjacent ends of the crank shafts provided with beveled gears held in spaced relation, main driving shafts provided with beveled gears thereon, said beveled gears meshing with the said crank shaft beveled gears and driven thereby, and means for transmitting power from the said main driving shafts to the car wheels.

9. A motor car comprising a car body, trucks pivotally secured thereto by king bolts, a combustion engine including two units of the horizontal opposed cylinder type rigidly secured to the car body, said units spaced a distance apart, main driving shafts extending centrally between said units and gearedly connected to the crank shafts thereof, beveled gears rigidly secured to the ends of the main driving shaft, means whereby the speed imparted to the said beveled gears may be varied with equal engine speeds, a vertical shaft rigidly secured to the car body, a reversing mechanism including upper and lower beveled gears, a spur gear positioned therebetween and adapted to hold said beveled gears in spaced relation and to be driven thereby, means for shifting the said spur and beveled gears upon said vertical shaft to bring the same in mesh with the said driving shafts, beveled gears, and spur gears journaled for rotation upon the truck king bolts and in mesh with the said shifting spur gear and adapted to be rotated thereby, and a counter shaft journaled for rotation upon the said car truck, means for transmitting motion from said king bolt spur gear to said counter shaft, and means for transmitting power from said counter shaft to the car wheels.

10. A driving mechanism for motor cars comprising a car under frame, king bolts extending downwardly therefrom, car trucks pivotally secured to said king bolts and adapted to rotate thereabout, an internal combustion engine rigidly secured to the car frame with the crank shaft thereof extending transversely of the longitudinal axis of the car frame, main driving shafts rotating in opposite directions gearedly connected to the said crank shafts, said main driving shafts extending to the forward and rear trucks, beveled gears rigidly secured to the ends of said main driving shafts, means for varying the velocity ratio of said beveled gears with relation to the engine speed, said means including spur gears and friction clutches, and vertical shafts rigidly secured to the car frame adjacent the said king bolts, slidable carriages mounted for rotation upon said vertical shafts and provided with two spacing beveled gears, a spur gear spaced therebetween and secured thereto, means for transmitting power from the last mentioned spur gears to the car wheels, means for shifting the sliding carriages, said means adapted to bring the upper beveled gear of the reversing mechanism into contact with the driving shaft beveled gear at one end simultaneously with the meshing of the lower beveled gear of the shifting mechanism disposed at the opposite end of the car with the other main driving shaft beveled gear, and means whereby the velocity ratio of the transmission mechanism of the two trucks will be simultaneously actuated.

In testimony that I claim the foregoing as my own, I have hereto affixed my signature in the presence of two witnesses.

DAVID P. SANDERS.

Witnesses:
WALTER K. BAER,
JAS. N. LIGHTNER.